E. T. ARMSTRONG.
Hay and Cotton Presses.
No. 154,209. Patented Aug. 18, 1874.
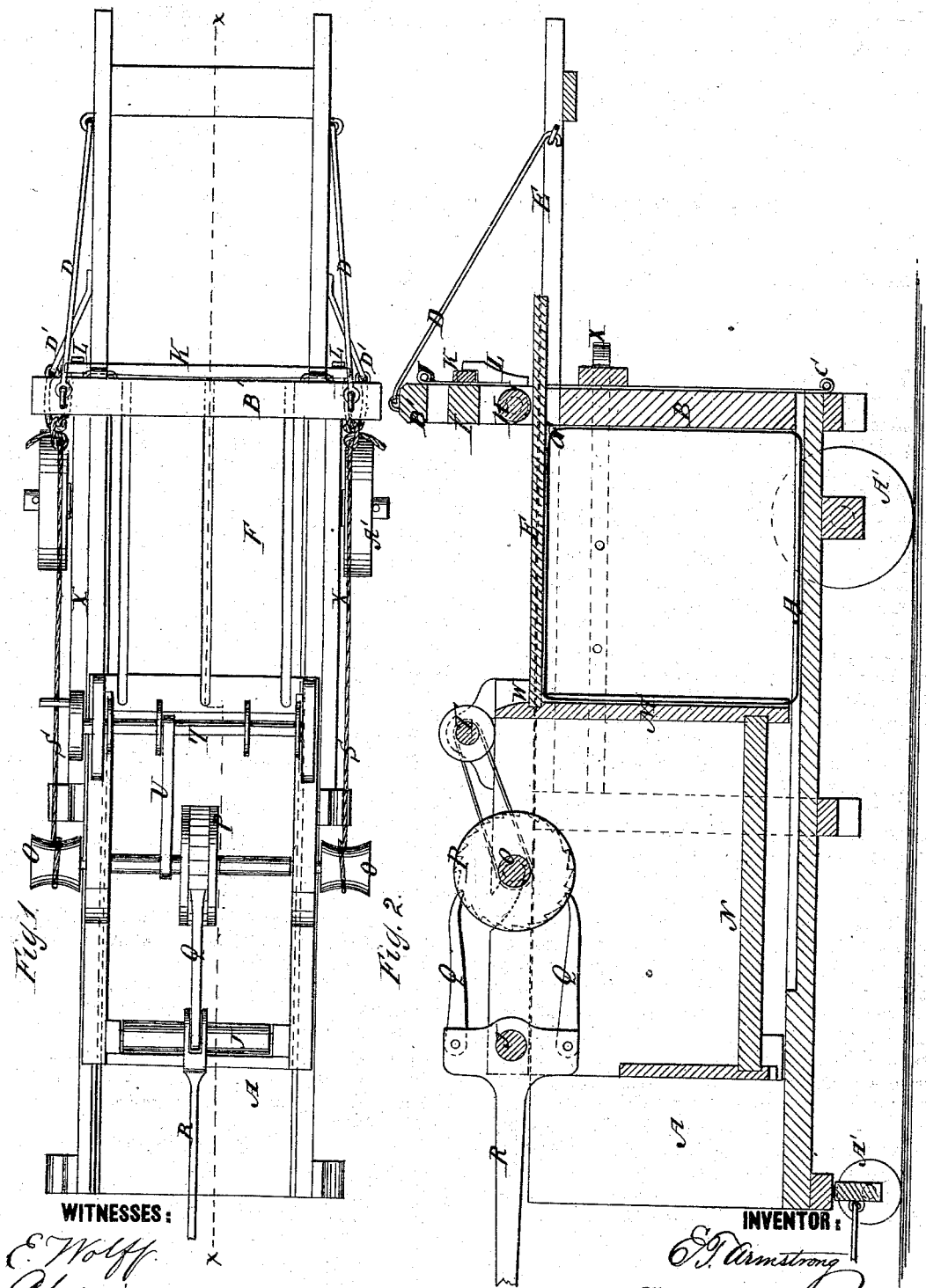
WITNESSES:
INVENTOR:
BY
ATTORNEYS.

UNITED STATES PATENT OFFICE.

EVILEE T. ARMSTRONG, OF BAKER CITY, OREGON.

IMPROVEMENT IN HAY AND COTTON PRESSES.

Specification forming part of Letters Patent No. 154,209, dated August 18, 1874; application filed May 16, 1874.

*To all whom it may concern:*

Be it known that I, EVILEE T. ARMSTRONG, of Baker City, in the county of Baker and State of Oregon, have invented a new and Improved Hay and Cotton Press, of which the following is a specification:

The invention will first be fully described, and then pointed out in the claims.

Figure 1 is a plan view of my improved hay-press. Fig. 2 is a longitudinal sectional elevation taken on the line $x\ x$ of Fig. 1.

Similar letters of reference indicate corresponding parts.

A represents a long horizontal case, at one end of which is the press-head B, attached at the lower edge by hinges C, and secured at the upper edge by detachable hooks X. E represents extension-bars, which are employed for the support of the cover F, when it extends beyond the press-head when the bale is pressed, passing through the slot G under the pressure-roller H. Said bars are detachably connected to frame B' by hooks D and D'. This roller is arranged in the frame I at the top of the press-head, which swings on hinges J, to release the case-top where it is to be removed after the bale is pressed. This frame is held in position by the bar K and cleats L. M represents the follower, which is also the front portion of a movable frame, N, which slides forward and backward in case A. This frame carries a windlass, O, with a ratchet, P, which is turned by pawls Q, worked by the hand T-lever R on the rock-shaft J. The windlass moves the frame and the follower by winding the ropes S on it, the ropes being attached to the press-head B. It also turns the tying-cord reel T by belt U, to wind the tying-cords on it, and take up the slack caused by the moving of the follower and the reel toward the press-head, the cords being adjusted before the operation begins. The top of the press-case is detachably connected to the follower in a groove, W, so that it can be taken off readily after the bale is pressed, for tying the cords and detaching the bale. When the cover is removed and the bale tied, the hooks X are detached and the head turned down to allow the bale to be discharged, by pushing forward in the same direction that the follower is moved to press the bale. The frame N and the windlass are then moved back, the pawls Q being first disconnected from the ratchet-wheel, to allow the windlass to turn backward and unwind the cords. The press, being arranged in this manner, is adapted for use as a portable machine, and is mounted on truck-wheels A', for moving it from place to place.

Having thus described my invention, what I claim as new, and desire to secure by Letters Patent, is—

1. The case-cover arranged to slide over the press-head and under the pressure-roller H, in the manner described.

2. The combination of reel-shaft T with the movable frame N, follower M, and press-case, as described.

3. The hinged frame I, pressure-roller H, holding-bar K, and cleats L, combined with the movable and detachable case-top, substantially as specified.

EVILEE THOMPSON ARMSTRONG.

Witnesses:
  LUTHER B. GORE,
  JAMES D. MCFARLAND.